(12) United States Patent
Clapper

(10) Patent No.: US 9,473,757 B2
(45) Date of Patent: Oct. 18, 2016

(54) PRESENTATION OF A MULTI-FRAME SEGMENT OF VIDEO CONTENT

(71) Applicant: INTEL CORPORATION, Santa Clara, CA (US)

(72) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 13/928,052

(22) Filed: Jun. 26, 2013

(65) Prior Publication Data

US 2015/0003816 A1    Jan. 1, 2015

(51) Int. Cl.
| | |
|---|---|
| *G11B 27/00* | (2006.01) |
| *H04N 5/93* | (2006.01) |
| *H04N 9/87* | (2006.01) |
| *H04N 21/2343* | (2011.01) |
| *H04N 21/4147* | (2011.01) |
| *H04N 21/472* | (2011.01) |
| *H04N 21/845* | (2011.01) |
| *H04N 5/783* | (2006.01) |

(52) U.S. Cl.
CPC ...... *H04N 9/8715* (2013.01); *H04N 21/23439* (2013.01); *H04N 21/4147* (2013.01); *H04N 21/47202* (2013.01); *H04N 21/8455* (2013.01)

(58) Field of Classification Search
USPC ........ 386/278, 280, 282, 285, 290, 343, 350
See application file for complete search history.

(56) References Cited

U.S. PATENT DOCUMENTS

| | | | |
|---|---|---|---|
| 2003/0063893 A1* | 4/2003 | Read | 386/46 |
| 2003/0142956 A1* | 7/2003 | Tomita | G11B 27/034 386/241 |
| 2014/0064703 A1* | 3/2014 | Takeuchi | 386/248 |

* cited by examiner

*Primary Examiner* — Daquan Zhao
(74) *Attorney, Agent, or Firm* — Schwabe, Williamson & Wyatt, P.C.

(57) ABSTRACT

In embodiments, apparatuses, methods and storage media are described that are associated with presentation of video data during pause. In embodiments, upon receipt of a pause command, a video presentation engine may repeatedly present a multi-frame segment of video content until a resume command is received. In embodiments, the multi-frame segment may begin at a point when the pause command is received or at an earlier point. Sound may be selectively played, in embodiments, along with the multi-frame segment. Other embodiments may be described and claimed.

17 Claims, 6 Drawing Sheets

PRESENTATION OF A MULTI-FRAME SEGMENT OF VIDEO CONTENT

TECHNICAL FIELD

The present disclosure relates to the field of data processing, in particular, to apparatuses, methods and storage media associated with presentation of a multi-frame segment of video content.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of media content, and the manners in which the content is consumed. Today, myriad media content may be made available from various sources of media content, including but not limited to fixed medium (e.g., Digital Versatile Disk (DVD)), broadcast, cable operators, satellite channels, Internet, and so forth. Users may consume content with a television set, a laptop or desktop computer, a tablet, a smartphone, or other devices of the like. In many instances, when viewing video content, a user may issue a command to suspend ongoing presentation of the video content, such as "pause," to freeze presentation on a single frame. When the user later issues a command to resume presentation, such as "play" or "resume," presentation of the video content may proceed from the frozen frame, without providing the user with any context of what was being presented at the time of the original suspension.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
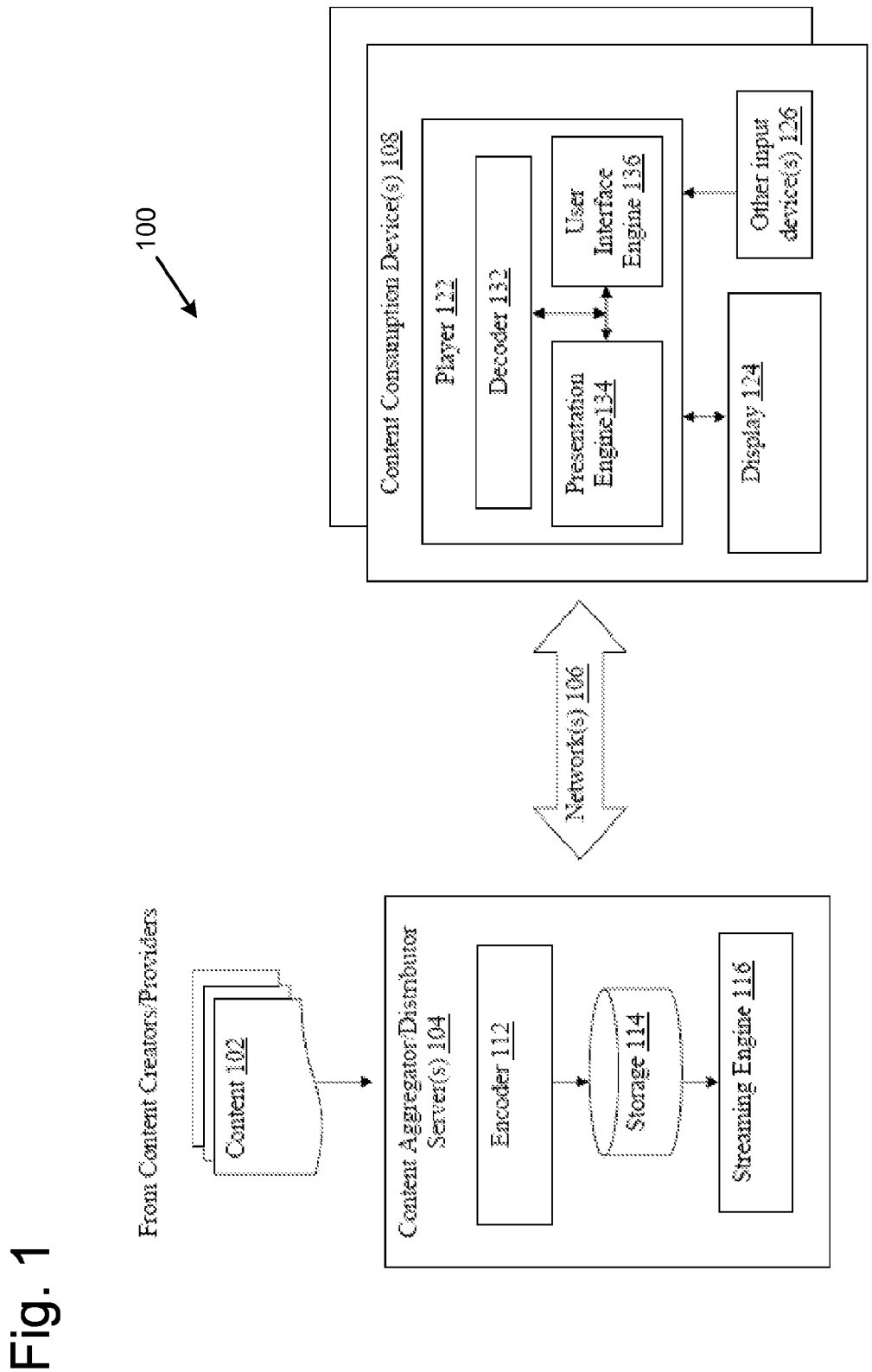
FIG. 1 illustrates an arrangement for content distribution and consumption, in accordance with various embodiments.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, via one or more networks 106.

In embodiments, as shown, content aggregator/distributor servers 104 may include encoder 112, storage 114 and content provisioning 116 (referred to as "streaming engine" in FIG. 1), which may be coupled to each other as shown. Encoder 112 may be configured to encode content 102 from various content providers, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube video, iReporter video), music albums/titles/pieces, and so forth. Examples of content creators and/or providers may include, but are not limited to, movie studios/ distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which content consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, as shown, a content consumption device 108 may include player 122, display 124 and user input device 126. Player 122 may be configured to receive streamed content, decode and recover the content from the content stream, and present the recovered content on display 124, in response to user selections/inputs from user input device 126.

In embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive the user selections/inputs from a user, and to selectively render a menu interface as described herein.

While shown as part of a content consumption device 108, display 124 and/or user input device(s) 126 may be stand-alone devices or integrated, for different embodiments of content consumption devices 108. For example, and as depicted in FIGS. 2-7, for a television arrangement, display 124 may be a stand-alone television set, Liquid Crystal Display (LCD), Plasma and the like, while player 122 may be part of a separate set-top set, and user input device 126 may be a separate remote control, gaming controller, keyboard, or another similar device. Similarly, for a desktop computer arrangement, player 122, display 124 and user input device(s) 126 may all be separate stand-alone units. On the other hand, for a mobile arrangement, such as a tablet computing device, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and user input device(s) 126 may be likewise integrated.

Figure 2:
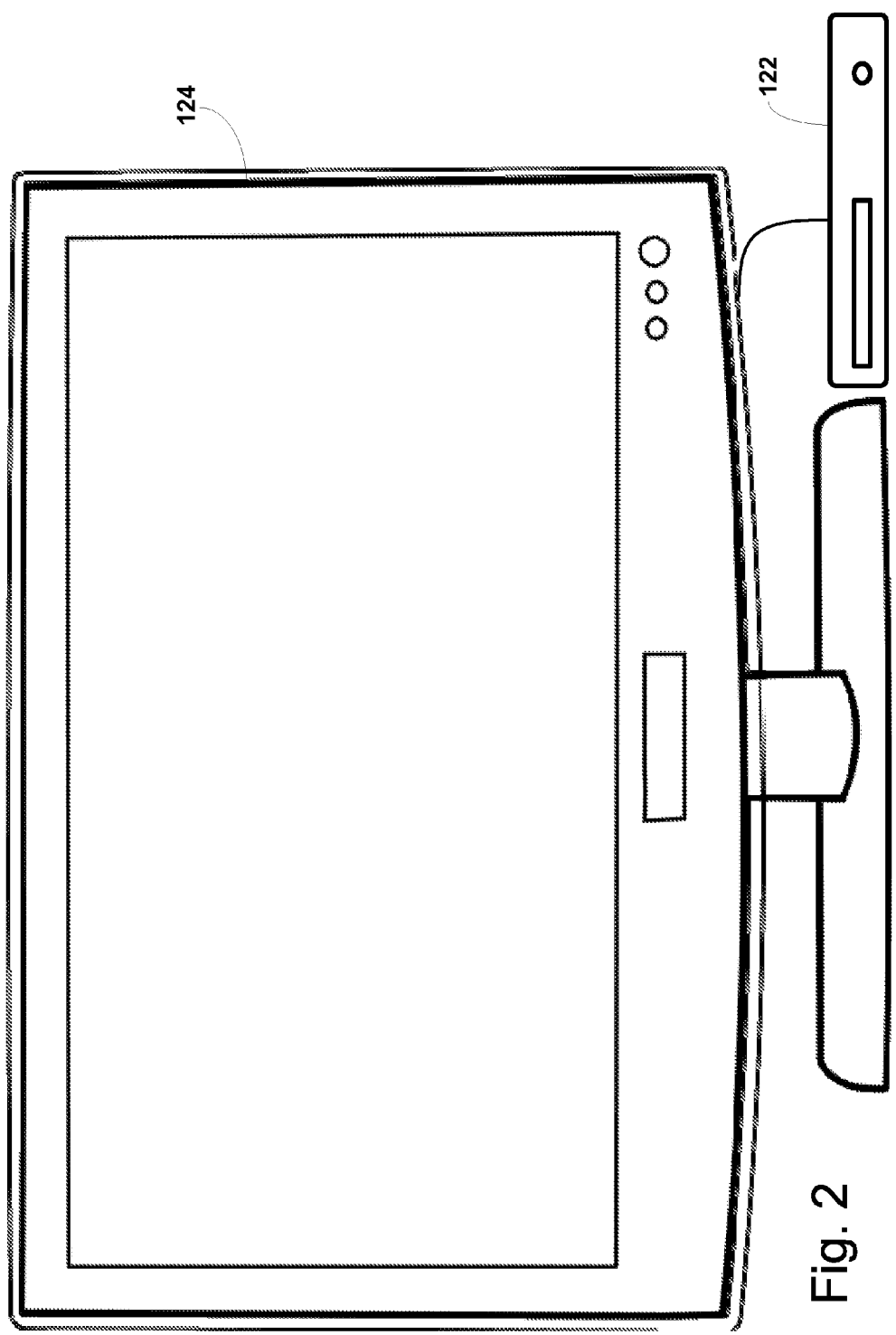
FIG. 2 illustrates an example player configured with applicable portions of the present disclosure to cause a television to present a media content, in accordance with various embodiments.

Referring now to FIG. 2, a player 122 in the form of a set-top box, or "console," (configured with applicable portions of the present disclosure) may be operably coupled to a display 124, shown here in the form of a flat panel television. In FIG. 2, presentation engine 134 and/or user interface engine 136 of player 122 may render underlying media content (not shown) on display 124. In various embodiments, the media content may be provided to player 122 by content aggregator/distributor server 104. In various embodiments, the media content may come from one or more media content sources, such as the one or more providers of content 102 in FIG. 1.

Figure 3:
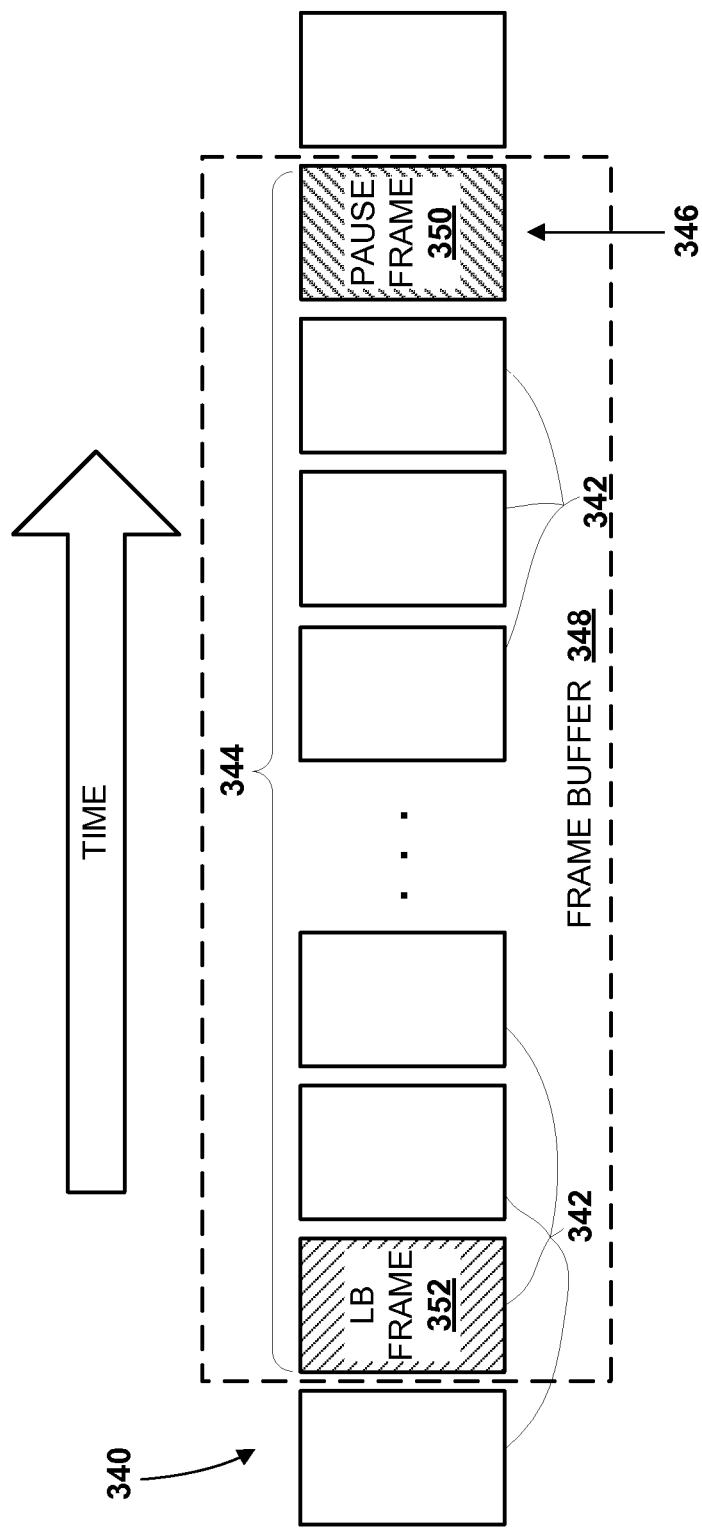
FIG. 3 schematically illustrates an example frame buffer that may be used to facilitate repeated presentation of a multi-frame video segment, in accordance with various embodiments.

Referring to FIG. 3, an example video content 340 may include a plurality of frames 342. In various embodiments, the plurality of frames 342 may be presented, e.g., by presentation engine 134 of player 122, in the order depicted by the "time" arrow shown in FIG. 1, although this is not required. For instance, in a "rewind" mode, plurality of frames 342 may be presented in reverse (i.e., right to left), at various speeds.

In various embodiments, player 122 may receive, e.g., from user input device 126, a first command to suspend continued presentation of video content 340. For example, a user may issue a "pause" command to a remote control and/or a touch screen of player 122. Rather than simply freezing the continued presentation of video content 340 on the frame(s) that was/were being presented at the time the first command was received, in various embodiments, presentation engine 134 of player 122 may be configured to repeatedly present a multi-frame segment 344 (also referred to as a "vignette" or "clip") of video content 340.

In various embodiments, presentation engine 134 may continue this repeated presentation until receipt of a second command, e.g., from user input device 126, to resume presentation of video content 340. For example, a user may issue a second pause command, or a "play" command, e.g., using a remote control and/or touch screen. Rather than resuming presentation from a single frozen frame—which may be confusing if the user has disengaged from video content mentally, e.g., by being away for a prolonged period—the user may instead be presented with multi-frame segment 344 of video content 340. This may provide the user with at least some context of a narrative of video content 340 at the time of issuance of the command to suspend presentation.

Presentation engine 134 may implement the repeated playback of multi-frame segment 344 in various ways. In some embodiments, presentation engine 134 may be configured to preserve a pause point 346 in video content 340 for which presentation coincides temporally with receipt of the command to suspend presentation. In various embodiments, this point may be preserved as a frame, a pointer to a frame, etc. For example, in FIG. 3, presentation engine 134 may store multi-frame segment 344 in a frame buffer 348. In various embodiments, frame buffer 348 may be a portion of various types of memory having a predetermined size. In various embodiments, frame buffer 348 may be a first in/first out ("FIFO") buffer, and may be continuously-shifted along with presentation of video content 340. In various embodiments, preserved point 346 may correspond to a last frame, or "pause" frame 350, within frame buffer 348 at the time the command to suspend presentation is received by player 122. Repeated playback of multi-frame segment 344 may include starting at a "loopback," or "LB" frame 352 at one end of frame buffer 348 and playing through frames until reaching pause frame 350, and then repeating (until a command to resume presentation is received).

In various embodiments, including the one depicted in FIG. 3, multi-frame segment 344 of video content 340 may be a multi-frame segment of video content 340 that precedes the preserved pause point 346, though this is not required. In various embodiments, multi-frame segment 344 may have a predetermined length and/or number of frames. In various embodiments, the length or number of frames may be adjustable by a user, e.g., by altering the size of frame buffer 348. In some embodiments, a default length of multi-frame segment 344 may be 5 seconds, 10 seconds, 15 seconds, 20 seconds, and so forth.

Techniques other than a frame buffer may be employed. For example, in some embodiments, presentation engine 134 may be configured to maintain a current pointer and a time-shifted pointer that is shifted by a predetermined number of frames or seconds relative to the current pointer. In various embodiments, presentation engine 134 may begin the repeated presentation of multi-frame segment 344 at the time-shifted pointer. During normal presentation of video content 340, the time shifted pointer may be shifted one frame forward for each frame of video content 340 presented. In some embodiments, count-back frame references may also be used.

In some embodiments, if, during the repeated playback of multi-frame segment 344, sound is on (e.g., if a mute button has not been pressed, or a user setting toggled), the user may be presumed to not be in the immediate vicinity of player 122. For instance, the user may have left the room to make a snack or use the restroom. Otherwise, if the user were in the immediate vicinity, the repeated sound could be distracting and potentially annoying, especially if the user is attempting to do something else, such as taking a phone call. In such a situation, when the user issues a command to resume presentation, the user may be more likely to be reengaging with video content 340 after some mental and/or physical absence (e.g., bathroom break, grabbing a snack). Simply resuming presentation of video content 340 at the exact point at which it was suspended, as is done with existing media playing devices, may cause the user to be disoriented or confused with regard to a narrative of video content 340 upon resumption of presentation. Allowing multi-frame segment 344 to play out from a point in time at which the resume command is received by presentation engine 134 may avoid or reduce such confusion or disorientation. The user may become reacquainted with the context/narrative of the portion of video content 340 that was being presented when the user issued the command to suspend presentation (e.g., "pause").

Conversely, if, during the repeated playback, sound is off (e.g., a mute button has been pressed, or a user setting toggled), the user may be presumed to be in the same vicinity as player 122, or at least within audible range of speakers controlled by player 122. The sound may be off because the user is trying to do something else, like take a phone call or explain a plot point to another viewer, in which case leaving the sound on could be distracting and/or annoying. In such case, the user's reengagement with video content 340 may not be as difficult as if the user had left the room for a period of time. In such case, a better user experience may be achieved by resuming presentation of video content 340 from the preserved pause point 346 (e.g., pause frame 350) being presented when the user issued the command to suspend presentation, as the user may be ready to pick up immediately where she left off. In some embodiments, presentation engine 134 may be configured by default to mute sound when the command to suspend presentation is received.

Accordingly, in various embodiments, presentation engine 134 may be configured to, upon receipt of the command to resume presentation, selectively resume presentation of the video content from various points of multi-frame segment 344 of video content 340 based on whether the repeated playback of multi-frame segment 344 is accompanied by sound. For example, in various embodiments, presentation engine 134 may be configured to resume presentation from preserved point 346, e.g., in response to a determination that repeated presentation of multi-frame segment 344 is not accompanied by sound. On the other hand, if the repeated presentation of multi-frame segment 344 is accompanied by sound, then presentation engine 134 may resume presentation of video content 340 from another point in multi-frame segment 344. For instance, on receipt of the second command, presentation engine 134 may simply allow multi-frame segment 344 to run out, in spite of the fact that the user may have already consumed all or a portion of multi-frame segment 344. As noted above, this may allow a user to reacquaint themselves with a narrative of video content 340, e.g., by completing consumption of the repeating vignette.

Commands described herein may be issued by users to player 122 from user input devices 126 of various types. In embodiments where content consumption device 108 is a set-top box or media player, such as in FIG. 2, commands may be issued by users using a remote control device (not shown). In embodiments where content consumption device 108 and/or player 122 is a mobile computing device such as a smartphone or tablet computer, the aforementioned commands may be issued by a user through one or more gestures made on or near a touch screen, or by using buttons or knobs and/or other actuators.

Figure 4:
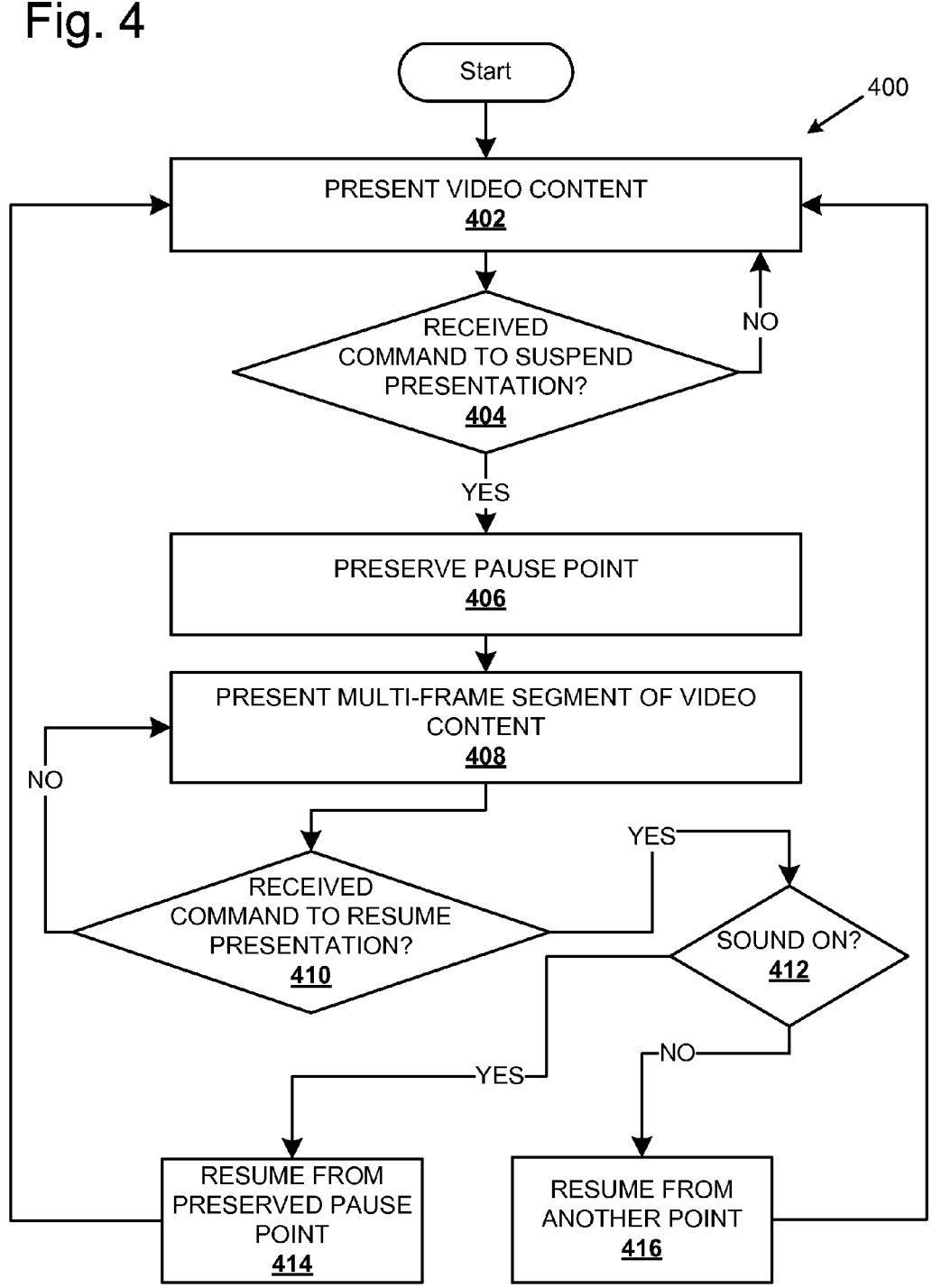
FIG. 4 depicts an example process that may be implemented on various computing devices described herein, in accordance with various embodiments.

FIG. 4 depicts an example process 400 that may be implemented by various computing devices, such as content consumption device 108, in accordance with various embodiments. At operation 402, video content 340 may be presented, e.g., by presentation engine 134 on display 124. At operation 404, if a command to suspend presentation of video content 340 has not been received by presentation engine 134, then method 400 may proceed back to 402, and presentation may continue. However, if at operation 404, a command to suspend presentation has been received by presentation engine 134, the process 400 may proceed to operation 406.

At operation 406, preserved pause point 346 (e.g., a pointer or pause frame 350) may be preserved, e.g., by presentation engine 134. At operation 408, multi-frame segment 344 of video content 340 may be presented, e.g., by presentation engine 134 on display 124. After presentation of multi-frame segment 344, at operation 410, if a command to resume presentation of video content 340 (e.g., a "play" or "resume") command has not been received, e.g., by presentation engine 134, then process 400 may proceed back to operation 408, and multi-frame segment 344 may be presented again.

However, if at operation 410, a command to resume presentation of video content 340 has been received, then method may proceed to operation 412. At operation 412, a determination may be made of whether presentation of the multi-frame segment 344 at block 408 was accompanied by sound. If the answer is yes, then at operation 414, presentation of video content 340 may be resumed, e.g., by presentation engine 134, from preserved pause point 346 at operation 414, and method may proceed back to operation 402. However, if the answer is no, then presentation of video content 340 may be resumed from another point in multi-frame segment 344 at operation 416, and process 400 may proceed back to operation 402. For example, presentation engine 134 may simply allow presentation of multi-frame segment 344 to continue from the point of multi-frame segment 344 that was being presented when the resume command was received, and then to transition smoothly into resumed presentation of video content 340 after preserved point 346.

Figure 5:
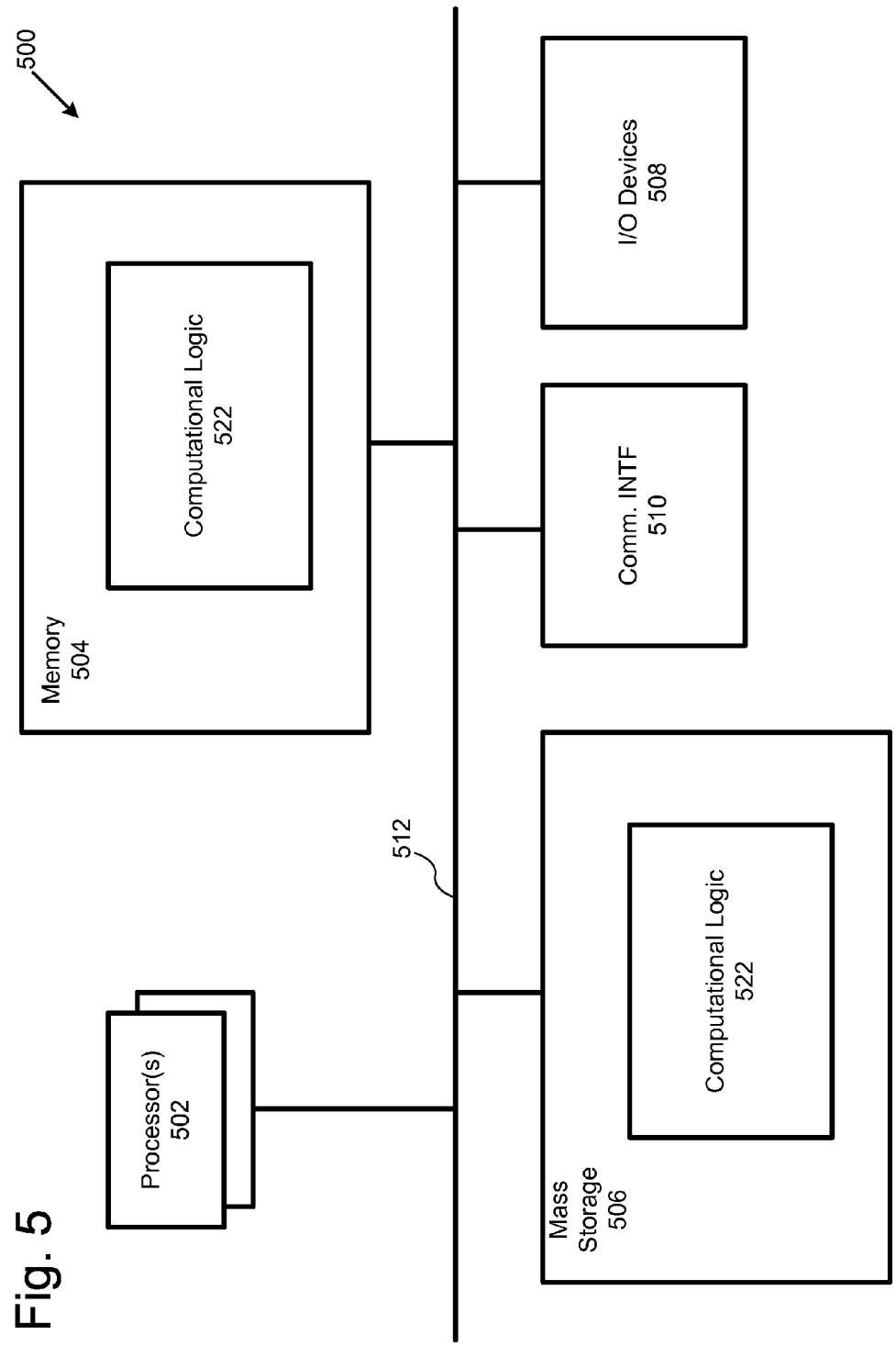
FIG. 5 illustrates an example computing environment suitable for practicing various aspects of the disclosure, in accordance with various embodiments.

Referring now to FIG. 5, an example computer suitable for use for various components of FIG. 1, such as content consumption device 108, is illustrated in accordance with various embodiments. As shown, computer 500 may include one or more processors or processor cores 502, and system memory 504. For the purpose of this application, including the claims, the terms "processor" and "processor cores" may be considered synonymous, unless the context clearly requires otherwise. Additionally, computer 500 may include mass storage devices 506 (such as diskette, hard drive, compact disc read only memory (CD-ROM) and so forth), input/output devices 508 (such as display, keyboard, cursor control, remote control, gaming controller, image capture device, and so forth) and communication interfaces 510 (such as network interface cards, modems, infrared receivers, radio receivers (e.g., Bluetooth), and so forth). The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage devices 506 may be employed to store a working copy and a permanent copy of the programming instructions implementing the operations associated with content consumption device 108, e.g., operations shown in FIG. 4. The various elements may be implemented by assembler instructions supported by processor(s) 502 or high-level languages, such as, for example, C, that can be compiled into such instructions.

The permanent copy of the programming instructions may be placed into permanent mass storage devices 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices.

The number, capability and/or capacity of these elements 510-512 may vary, depending on whether computer 500 is used as a content aggregator/distributor server 104 or a content consumption device 108 (e.g., a player 122), as well as whether computer 500 is a stationary computing device, such as a set-top box or desktop computer, or a mobile computing device such as a tablet computing device, laptop computer or smartphone. Their constitutions are otherwise known, and accordingly will not be further described.

Figure 6:
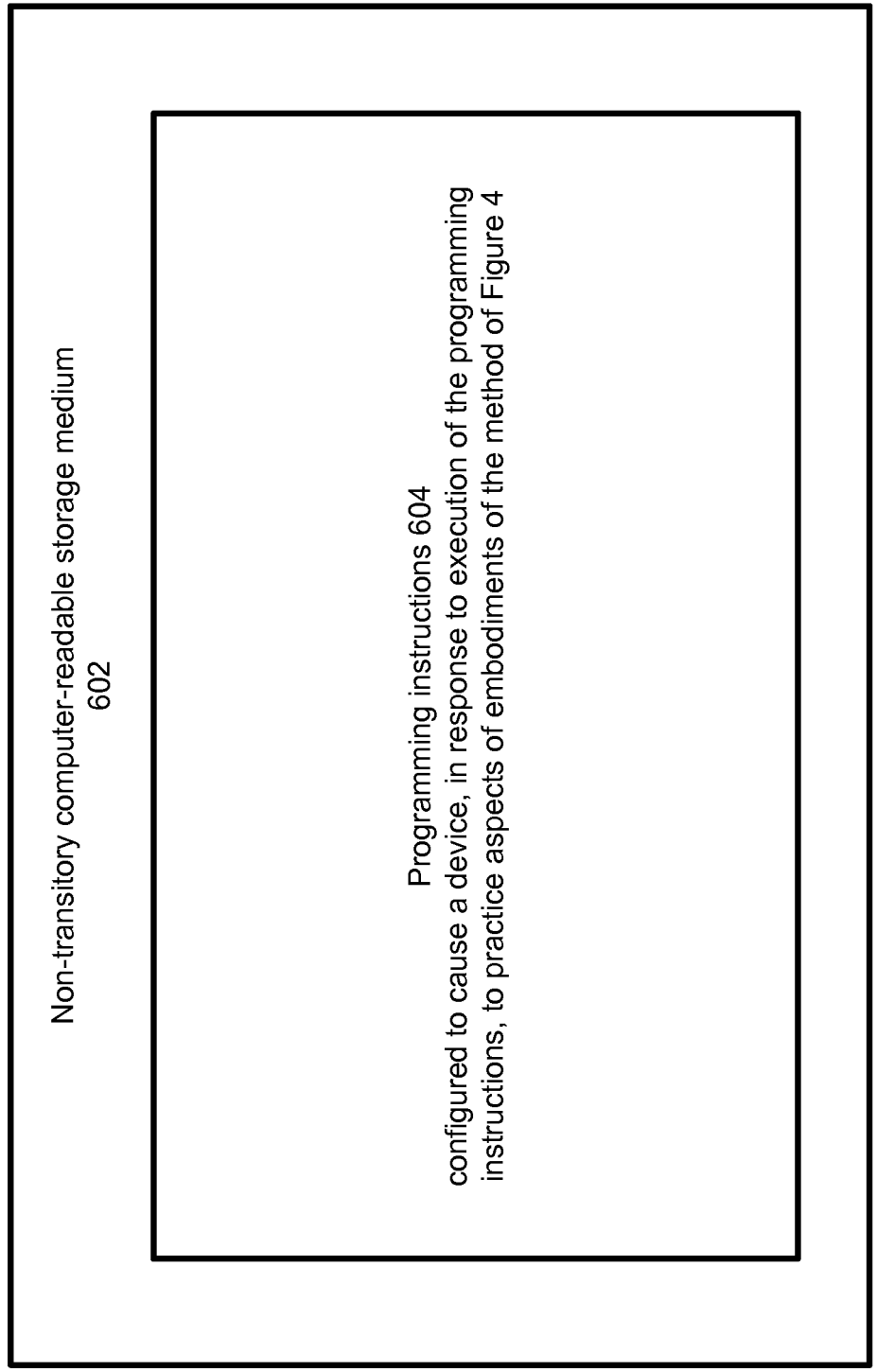
FIG. 6 illustrates an example storage medium with instructions configured to enable an apparatus to practice various aspects of the present disclosure, in accordance with various embodiments.

FIG. 6 illustrates an example non-transitory computer-readable storage medium 602 having instructions configured to practice all or selected ones of the operations associated with content aggregator/distributor servers 104 or content consumption devices 108, earlier described, in accordance with various embodiments. As illustrated, non-transitory computer-readable storage medium 602 may include a number of programming instructions 604. Programming instructions 604 may be configured to enable a device, e.g., computer 500, in response to execution of the programming instructions, to perform, e.g., various operations of process 400 of FIG. 4. In alternate embodiments, programming instructions 604 may be disposed on multiple non-transitory computer-readable storage media 602 instead.

Referring back to FIG. 5, for one embodiment, at least one of processors 502 may be packaged together with computational logic 522 configured to practice aspects of process 400 of FIG. 4. For one embodiment, at least one of processors 502 may be packaged together with computational logic 522 configured to practice aspects of process 400 of FIG. 4 to form a System in Package (SiP). For one embodiment, at least one of processors 502 may be integrated on the same die with computational logic 522 configured to practice aspects of process 400 of FIG. 4. For one embodiment, at least one of processors 502 may be packaged together with computational logic 522 configured to practice aspects of process 400 of FIG. 4 to form a System on Chip (SoC). For at least one embodiment, the SoC may be utilized in, e.g., but not limited to, a mobile computing device such as a computing tablet or smartphone.

The following paragraphs describe examples of various embodiments.

Example 1 may include at least one computer-readable medium including instructions that, in response to execution of the instructions by a media player computing device, cause the media player computing device to, on receipt of a first command to suspend continued presentation of video content, repeatedly present a multi-frame segment of the video content until receipt of a second command to resume presentation of the video content.

Example 2 may include one computer-readable medium of example 1, wherein the instructions, in response to execution by the media player computing device, further cause the media player computing device to preserve a pause point in the video content for which presentation coincides temporally with receipt of the first command.

Example 3 may include the at least one computer-readable medium of example 2, wherein the instructions, in response to execution by the media player computing device, further cause the media player computing device to selectively resume presentation of the video content from the preserved pause point or another point in the repeatedly presented multi-frame segment of the video content.

Example 4 may include the at least one computer-readable medium of example 3, wherein the selectively resume presentation includes resume presentation from the another point in response to a determination that the repeated presentation of the multi-frame segment of the video content is accompanied by sound.

Example 5 may include the at least one computer-readable medium of example 3, wherein the selectively resume presentation includes resume presentation from the preserved pause point in response to a determination that the repeated presentation of the multi-frame segment of the video content is not accompanied by sound.

Example 6 may include the at least one computer-readable medium of any one of examples 1-5, wherein the first and/or second command is received wirelessly from a remote control.

Example 7 may include the at least one computer-readable medium of example 2, wherein the multi-frame segment of the video content includes a multi-frame segment of the video content that precedes the preserved pause point.

Example 8 may include the at least one computer-readable medium of example 7, wherein the multi-frame segment has a predetermined length or number of frames that is adjustable by a user.

Example 9 may include the at least one computer-readable medium of any one of examples 1-5, wherein the repeated presentation of the multi-frame segment is selectively accompanied by sound based on a user command and/or a user preference.

Example 10 may include the at least one computer-readable medium of any one of examples 1-5, wherein the multi-frame segment is stored in a frame buffer that is continuously-shifted along with presentation of the video content.

Example 11 may include the at least one computer-readable medium of example 10, wherein the frame buffer is a first in/first out ("FIFO") buffer.

Example 12 may include the at least one computer-readable medium of any one of examples 1-5, wherein the instructions, in response to execution by the media player computing device, further cause the media player computing device to maintain a current pointer and a time-shifted pointer that is shifted by a predetermined number of frames relative to the current pointer, and wherein the repeated presentation of the multi-frame segment begins at the time-shifted pointer.

Example may include a computer-implemented method. The method may include receiving, by a media player computing device, a first command to suspend continued presentation of video content. The method may further include, in response to receiving the first command, repeatedly presenting, by the media-player computing device, a multi-frame segment of the video content. The method may further include receiving, by the media player computing device, a second command to resume presentation of the video content. The method may further include, in response to receiving the second command, ceasing, by the media player computing device, the repeated presenting of the multi-frame segment and resuming presentation of the video content.

Example 14 may include the computer-implemented method of example 13, further including preserving, by the media player computing device, a pause point in the video content for which presentation coincides temporally with receipt of the first command.

Example 15 may include the computer-implemented method of example 14, further including selectively resuming presentation of the video content from the preserved pause point or another point in the repeatedly presented multi-frame segment of the video content.

Example 16 may include the computer-implemented method of example 15, wherein the selectively resuming includes resuming, by the media player computing device, presentation from the another point in response to a determination that the repeated presentation of the multi-frame segment of the video content is accompanied by sound.

Example 17 may include the computer-implemented method of example 15, wherein the selectively resuming includes resuming, by the media player computing device, presentation from the preserved pause point in response to a determination that the repeated presentation of the multi-frame segment of the video content is not accompanied by sound.

Example 18 may include the computer-implemented method of any one of examples 13-17, wherein receiving the first and/or second command includes receiving the first and/or second command wirelessly from a remote control.

Example 19 may include the computer-implemented method of example 14, wherein the multi-frame segment of the video content includes a multi-frame segment of the video content that precedes the preserved pause point.

Example 20 may include the computer-implemented method of example 19, wherein the multi-frame segment has a predetermined length or number of frames that is adjustable by a user.

Example 21 may include the computer-implemented method of any one of examples 13-17, wherein the repeated presentation of the multi-frame segment is selectively accompanied by sound based on a user command and/or a user preference.

Example 22 may include the computer-implemented method of any one of examples 13-17, wherein the multi-frame segment is stored in a frame buffer that is continuously-shifted along with presentation of the video content.

Example 23 may include the computer-implemented method of example 22, wherein the frame buffer is a first in/first out ("FIFO") buffer.

Example 24 may include the computer-implemented method of any one of examples 13-17, further including maintaining, by the media player computing device, a current pointer and a time-shifted pointer that is shifted by a predetermined number of frames relative to the current pointer, and wherein the repeatedly presenting includes repeatedly presenting the multi-frame segment beginning at the time-shifted pointer.

Example 25 may include an apparatus. The apparatus may include one or more processors. The apparatus may also include a presentation engine coupled with the one or more processors and configured to, on receipt of a first command to suspend continued presentation of video content, repeatedly present a multi-frame segment of the video content until receipt of a second command to resume presentation of the video content.

Example 26 may include the apparatus of example 25, wherein the presentation engine is further to preserve a pause point in the video content for which presentation coincides temporally with receipt of the first command.

Example 27 may include the apparatus of example 26, wherein the presentation is further to selectively resume presentation of the video content from the preserved pause point or another point in the repeatedly presented multi-frame segment of the video content.

Example 28 may include the apparatus of example 27, wherein the presentation engine is further to resume presentation from the another point in response to a determination that the repeated presentation of the multi-frame segment of the video content is accompanied by sound.

Example 29 may include the apparatus of example 27, wherein the presentation engine is further to resume presentation from the preserved pause point in response to a determination that the repeated presentation of the multi-frame segment of the video content is not accompanied by sound.

Example 30 may include the apparatus of any one of examples 25-29, wherein the first and/or second command is received wirelessly from a remote control.

Example 31 may include the apparatus of example 26, wherein the multi-frame segment of the video content includes a multi-frame segment of the video content that precedes the preserved pause point.

Example 32 may include the apparatus of example 31, wherein the multi-frame segment has a predetermined length or number of frames that is adjustable by a user.

Example 33 may include the apparatus of any one of examples 25-29, wherein the repeated presentation of the multi-frame segment is selectively accompanied by sound based on a user command and/or a user preference.

Example 34 may include the apparatus of any one of examples 25-29, wherein the multi-frame segment is stored in a frame buffer that is continuously-shifted along with presentation of the video content.

Example 35 may include the apparatus of example 34, wherein the frame buffer is a first in/first out ("FIFO") buffer.

Example 36 may include the apparatus of any one of examples 25-29, wherein the presentation engine is further to maintain a current pointer and a time-shifted pointer that is shifted by a predetermined number of frames relative to the current pointer, and to begin the repeated presentation of the multi-frame segment at the time-shifted pointer.

Example 37 may include an apparatus. The apparatus may include means for receiving a first command to suspend continued presentation of video content. The apparatus may also include means for repeatedly presenting a multi-frame segment of the video content in response to the means for receiving the first command. The apparatus may also include means for receiving a second command to resume presentation of the video content. The apparatus may also include means for ceasing the repeated presenting of the multi-frame segment and resuming presentation of the video content in response to the means for receiving the second command.

Example 38 may include the apparatus of example 37, further including means for preserving a pause point in the video content for which presentation coincides temporally with receipt of the first command.

Example 39 may include the apparatus of example 38, further including means for selectively resuming presentation of the video content from the preserved pause point or another point in the repeatedly presented multi-frame segment of the video content.

Example 40 may include the apparatus of example 39, wherein the means for selectively resuming include means for resuming presentation from the another point in response to a determination that the repeated presentation of the multi-frame segment of the video content is accompanied by sound.

Example 41 may include the apparatus of example 39, wherein the means for selectively resuming include means for resuming presentation from the preserved pause point in response to a determination that the repeated presentation of the multi-frame segment of the video content is not accompanied by sound.

Example 42 may include the apparatus of any one of examples 37-41, wherein the means for receiving the first and/or second command includes means for receiving the first and/or second command wirelessly from a remote control.

Example 43 may include the apparatus of example 38, wherein the multi-frame segment of the video content includes a multi-frame segment of the video content that precedes the preserved pause point.

Example 44 may include the apparatus of example 43, wherein the multi-frame segment has a predetermined length or number of frames that is adjustable by a user.

Example 45 may include the apparatus of any one of examples 37-41, wherein the repeated presentation of the multi-frame segment is selectively accompanied by sound based on a user command and/or a user preference.

Example 46 may include the apparatus of any one of examples 37-41, wherein the multi-frame segment is stored in a frame buffer that is continuously-shifted along with presentation of the video content.

Example 47 may include the apparatus of example 46, wherein the frame buffer is a first in/first out ("FIFO") buffer.

Example 48 may include the apparatus of any one of examples 37-41, further including means for maintaining a current pointer and a time-shifted pointer that is shifted by a predetermined number of frames relative to the current pointer, wherein the means for repeatedly presenting include means for repeatedly presenting the multi-frame segment beginning at the time-shifted pointer.

Computer-readable media (including non-transitory computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory computer-readable medium comprising instructions that, in response to execution of the instructions by a media player computing device, cause the media player computing device to, on receipt of a first command to suspend continued presentation of video content:
preserve a pause point in the video content, wherein the pause point coincides temporally with receipt of the first command;
maintain a current pointer and a time-shifted pointer that is shifted by a predetermined number of frames relative to the current pointer;
repeatedly present a multi-frame segment of the video content prior to any subsequent command to resume presentation, wherein the repeated presentation of the multi-frame segment begins at the time-shifted pointer; and
selectively resume presentation of the video content from the preserved pause point or another point in the repeatedly presented multi-frame segment of the video content, the selectively resume based at least in part on whether the repeated presentation of the multi-frame segment is accompanied by sound; and
wherein the media player computing device is to repeatedly present the multi-frame segment until receipt of a second command to resume presentation of the video content.

2. The at least one non-transitory computer-readable medium of claim 1, wherein selectively resume presentation comprises resume presentation from the another point in response to a determination that the repeated presentation of the multi-frame segment of the video content is accompanied by sound.

3. The at least one non-transitory computer-readable medium of claim 1, wherein selectively resume presentation comprises resume presentation from the preserved pause point in response to a determination that the repeated presentation of the multi-frame segment of the video content is not accompanied by sound.

4. The at least one non-transitory computer-readable medium of claim 1, wherein the first and/or second command is received wirelessly from a remote control.

5. The at least one non-transitory computer-readable medium of claim 1, wherein the multi-frame segment of the video content comprises a multi-frame segment of the video content that precedes the preserved pause point.

6. The at least one non-transitory computer-readable medium of claim 5, wherein the multi-frame segment has a predetermined length or number of frames that is adjustable by a user.

7. The at least one non-transitory computer-readable medium of claim 1, wherein the repeated presentation of the multi-frame segment is selectively accompanied by sound based on a user command and/or a user preference.

8. The at least one non-transitory computer-readable medium of claim 1, wherein the multi-frame segment is stored in a frame buffer that is continuously-shifted along with presentation of the video content.

9. The at least one non-transitory computer-readable medium of claim 8, wherein the frame buffer is a first in/first out ("FIFO") buffer.

10. An apparatus comprising:
one or more processors; and
a presentation engine coupled with the one or more processors, wherein the presentation engine is to, on receipt of a first command to suspend continued presentation of video content:
preserve a pause point in the video content, wherein the pause point coincides temporally with receipt of the first command;
maintain a current pointer and a time-shifted pointer that is shifted by a predetermined number of frames relative to the current pointer;
repeatedly present a multi-frame segment of the video content prior to any subsequent command to resume presentation, wherein the repeated presentation of the multi-frame segment begins at the time-shifted pointer; and
selectively resume presentation of the video content from the preserved pause point or another point in the repeatedly presented multi-frame segment of the video content, the selectively resume based at least in part on whether the repeated presentation of the multi-frame segment is accompanied by sound; and
wherein the presentation engine is to repeatedly present the multi-frame segment until receipt of a second command to resume presentation of the video content.

11. The apparatus of claim 10, wherein the multi-frame segment of the video content comprises a multi-frame segment of the video content that precedes the preserved pause point.

12. The apparatus of claim 10, wherein the repeated presentation of the multi-frame segment is selectively accompanied by sound based on a user command and/or a user preference.

13. A computer-implemented method, comprising:
receiving, by a media player computing device, a first command to suspend continued presentation of video content;
in response to receiving the first command:
preserving, by the media player computing device, a pause point in the video content, wherein the pause point coincides temporally with receipt of the first command;
maintaining a current pointer and a time-shifted pointer that is shifted by a predetermined number of frames relative to the current pointer; and
repeatedly presenting, by the media-player computing device, a multi-frame segment of the video content prior to any subsequent command to resume presentation, wherein the repeated presentation of the multi-frame segment begins at the time-shifted pointer;
receiving, by the media player computing device, a second command to resume presentation of the video content; and
in response to receiving the second command:

ceasing, by the media player computing device, the repeated presenting of the multi-frame segment and resuming presentation of the video content; and selectively resuming, by the media player computing device, presentation of the video content from the preserved pause point or another point in the repeatedly presented multi-frame segment of the video content, the selectively resuming based at least in part on whether the repeated presentation of the multi-frame segment is accompanied by sound.

14. The computer-implemented method of claim 13, further comprising selectively resuming presentation of the video content from the preserved pause point or another point in the repeatedly presented multi-frame segment of the video content.

15. The computer-implemented method of claim 13, wherein the repeated presentation of the multi-frame segment is selectively accompanied by sound based on a user command and/or a user preference.

16. An apparatus comprising:

means to receive a first command to suspend continued presentation of video content;

means to, in response to receipt of the first command, preserve a pause point in the video content, wherein the pause point coincides temporally with receipt of the first command, maintain a current pointer and a time-shifted pointer that is shifted by a predetermined number of frames relative to the current pointer, and repeatedly present a multi-frame segment of the video content beginning at the time-shifted pointer prior to any subsequent command to resume presentation;

means to receive a second command to resume presentation of the video content;

means to, in response to receipt of the second command, cease the repeated presentation of the multi-frame segment and resuming presentation of the video content and selectively resume presentation of the video content from the preserved pause point or another point in the repeatedly presented multi-frame segment of the video content, the selectively resume being based at least in part on whether the repeated presentation of the multi-frame segment is accompanied by sound.

17. The apparatus of claim 16, wherein the repeated presentation of the multi-frame segment is selectively accompanied by sound based on a user command and/or a user preference.

* * * * *